United States Patent [19]

Gerdes

[11] 4,294,281
[45] Oct. 13, 1981

[54] RELIEF VALVE

[75] Inventor: Theodor Gerdes, Langenfeld, Fed. Rep. of Germany

[73] Assignee: Blau KG Fabrik fur Kraftfahrzeugteile, Langenfeld, Fed. Rep. of Germany

[21] Appl. No.: 101,543

[22] Filed: Dec. 10, 1979

[30] Foreign Application Priority Data

Dec. 21, 1978 [DE] Fed. Rep. of Germany ....... 2855290

[51] Int. Cl.³ .............................................. F16K 15/02
[52] U.S. Cl. ..................................... 137/541; 251/359
[58] Field of Search ................ 137/541; 251/356, 359, 251/DIG. 5; 285/DIG. 22

[56] References Cited

U.S. PATENT DOCUMENTS

| 1,774,690 | 9/1930 | Willoughby | 137/541 |
| 3,351,081 | 11/1967 | Bogossian et al. | 137/541 X |
| 3,396,743 | 8/1968 | Mackal et al. | 137/541 X |
| 3,590,851 | 7/1971 | Bogossian et al. | 137/541 X |
| 4,056,121 | 11/1977 | Gerdes | 137/541 |

Primary Examiner—William R. Cline
Attorney, Agent, or Firm—Gifford, VanOphem, Sheridan & Sprinkle

[57] ABSTRACT

A pressure relief valve has a valve disc with a valve stem extending through a valve opening and an annular sealing washer disposed between the disc and a valve seat about the valve opening operated by a limitedly flexible, spring loaded, longitudinally ribbed, holding element with a conically tapering central aperture through a central hub thereof through which the valve stem extends to dispose an enlarged valve stem head behind a hub shoulder.

6 Claims, 3 Drawing Figures

RELIEF VALVE

BACKGROUND OF INVENTION

Among the many types of pressure relief valves that have been developed is a simple and inexpensive valve having elements disposed on opposite sides of a valve opening or seat connected together by a stem on one inflexible part extending through the valve opening and having an enlarged head fitting into an opening in a relatively flexible valve disc so that spring loading of the first part seats the valve disc. Such a valve structure is shown in German Pat. No. 25 25 708 which corresponds to U.S. Pat. No. 4,056,121; however, it has been found that it is quite difficult to accurately determine the relative pressures for valve opening and also the opening pressure changes with time and valve use. The foregoing difficulties arise from the necessarily flexible nature of the valve disc mating with the valve seat. Deflection of the valve disc is only inaccurately predictable and furthermore will change with fatigue of the material so that spring loading pressure varies an indeterminate amount.

Valves of the type noted above are advantageous in their simplicity and the present invention provides a valve of this general type with no increase in complexity but without the noted limitations.

SUMMARY OF THE INVENTION

The present invention provides an improved valve of the type having a valve closure disc coupled to a spring loaded element on the opposite side of the valve seat by a stem extending through a conically tapered opening in a hub of the element and having an enlarged head disposed through the small end of the opening to bear on a shoulder whereby the disc and element are urged apart. The valve disc and integral stem are formed of a rigid material and the spring loaded element is formed of a limitedly elastic material so the stem head may be forced through the small end of the hub opening. The stem is formed with the same diameter as that of the small end of the hub opening to prevent relative lateral movement of the disc and element.

Only the small end of the noted hub opening need be flexibly expanded to join the disc and element by moving the stem head through the opening. Thus the valve disc which mates with the valve seat to close the valve is not deformed nor is it deformable during use and the hollow element is so constructed that substantially no deflection or deformation thereof occurs during use. In this respect the hollow element is formed with circumferentially space exterior longitudinal ribs about the hub with a substantial ring about the outer end of the ribs for engaging a compression spring disposed between the ring and a wall defining the valve seat opening.

The present invention provides a very accurately determinable value of differential pressure required to open the valve which does not change because of fatigue of the valve disc during use.

DESCRIPTION OF FIGURES

The present invention is illustrated with respect to a single preferred embodiment thereof in the accompanying drawing, wherein.

DESCRIPTION OF PREFERRED EMBODIMENT

Figure 1:
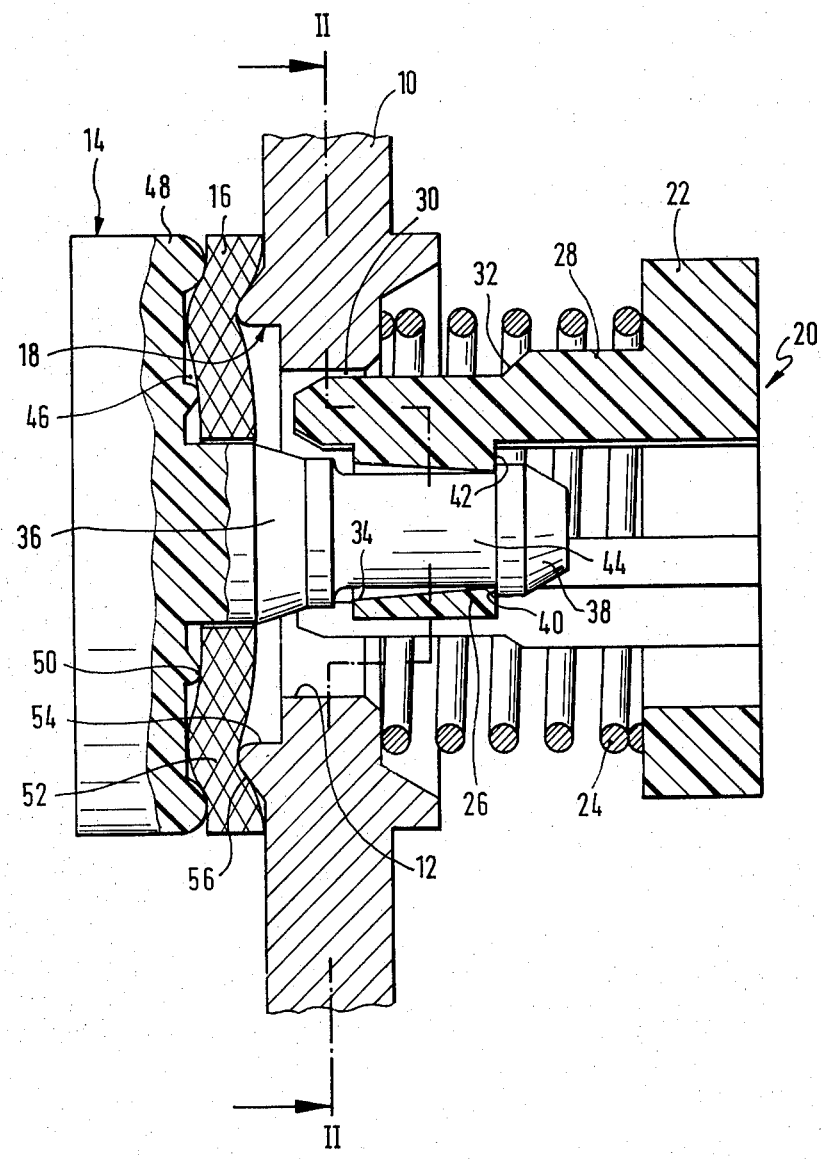
FIG. 1 is a central longitudinal section through a valve in accordance with the present invention.

The improved valve of the present invention may be employed for a variety of purposes and there is illustrated and described below a preferred embodiment of the present invention which may be employed in the closing cap of a fuel tank filler line of an automobile for the purpose of ventilating excess pressures that may from time to time build up in the tank. Referring now to the drawings there will be seen to be shown a wall 10 which may, for example, be disposed diagonally to the axis of the cap and to the filler pipe and which is adapted to have atmospheric pressure on the one side and fuel tank pressure on the other. The wall 10 has a cylindrical valve aperture 12 therethrough with which the present invention is adapted to cooperate. On the outer side of the partition wall 10, i.e., on the left-hand side as viewed in FIG. 1, there is provided a valve disc 14 having a greater diameter than the valve aperture 12 and covering this valve aperture with an annular sealing washer 16 disposed between the disc and wall. The sealing washer 16 cooperates with a valve seat 18 provided as an annular ridge about the valve aperture 12 on the wall 10 not only to seal the valve closed but also to provide for centering of the valve disc 14, as further described below.

The valve of the present invention additionally includes a holding element 20 disposed in engagement with the valve disc on the opposite side of the wall 10 therefrom. The holding element 20 is comprised as a central elongated portion with a substantially rigid annular ring or flange 22 extending outwardly about the end of the element disposed furthest from the wall 10. A compression spring 24 is disposed between this ring 22 and the inner side of the wall 10 as, for example, within a depression therein. This spring 24 determines the differential pressure required to open the valve of the present invention.

The holding element 20 additionally includes a hollow cylindrical hub 26 disposed in part within the valve aperture 12 and a plurality of longitudinal ribs 28 projecting radially outward from the hub 26 and circumferentially spaced thereabout. The ribs 28 extend longitudinally of the element to the ring 22 and preferably the ribs and ring are formed as a single integral piece of a strong limitedly elastic material such as plastic that is impervious to fuel or the fumes thereof. Considering further the longitudinal ribs 28 of the element 20 it is noted, particularly from FIG. 2 of the drawings, that substantial spaces are provided between the ribs about the hub 26 in order to provide as large an area as possible about the hub through the valve aperture. It is also noted from FIG. 2 that the outer circumference of the element 20 at the ribs 28 is somewhat smaller than the inside diameter of the valve aperture 12 in order to provide for rotation of the element in the aperture and also to admit of a small misalignment of the aperture with the element 20 so that dirt particles or the like will not interfere with operation of the valve. A radial separation or opening 30 is shown to be provided between the outer edges of the ribs 28 and the valve aperture 12. Additionally, the ribs 28 are radially expanded exteriorly of the valve aperture 12, as shown in FIG. 1 in order to maximize the mechanical strength of the holding element 20 and radial steps 32 in the ribs are shown in this figure.

Figure 2:
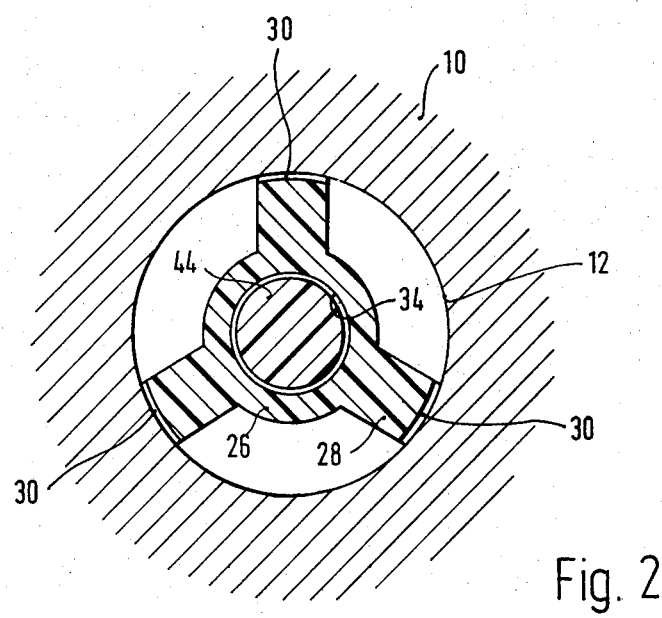
FIG. 2 is a transverse sectional view taken in the plane II—II of FIG. 1.
Figure 3:
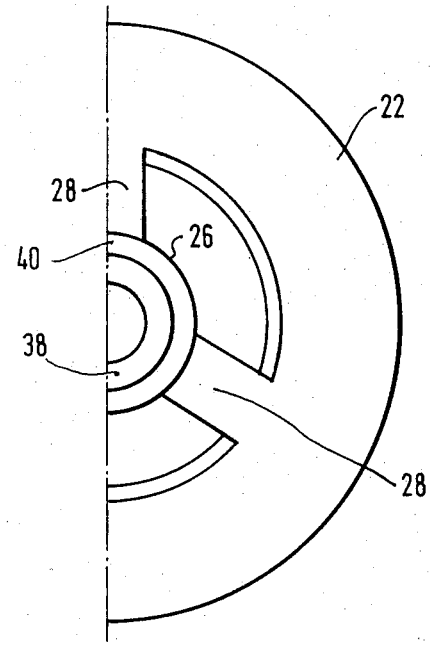
FIG. 3 is a partial end view of the valve of FIG. 1 as viewed from the right of such figure.

The hub 26 of the holding element 20, as shown in FIGS. 1 and 2, has an axial opening 34 therethrough of circular cross-section which tapers conically outward toward the valve disc 14. The holding element and valve disc are joined together and to this end the disc is provided with a valve stem 36 preferrably formed integrally with the disc with both the disc and stem being manufactured of a rigid inelastic but strong artificial material such as a plastic. The valve stem 36 extends through the washer 16 and through the opening 34 in the hub 26 of the holding element. The valve stem is provided at the outer end thereof with a head 38 formed integrally with the stem and serving as the connection between valve disc and holding element. The stem head 38 has a diameter that is larger than the smallest diameter of the opening 34 through the hub 26 and the disc and element are joined together by forcing this head through the hub opening whereby the hub interior is resiliently deflected at the smaller end thereof to allow passage of the stem head. The outer end of the hub 26 is provided with a shoulder 40 thereabout, as indicated in FIG. 1, and the stem head 38 is provided with a shoulder 42 thereabout at the juncture of the head and the stem so that these two shoulders 40 and 42 engage each other with the valve disc 14 and holding element 20 in full engagement, again as illustrated in FIG. 1. Minor misalignment of the valve disc and holding element will cause a portion of the shoulder 40 to engage the facing shoulder 42 so as to realign the elements and achieve an unidirectional effect.

The valve stem 36 includes a cylindrical section 44 disposed within the hub 26 of the holding element and the diameter of this cylindrical section 44 is equal to the smallest diameter of the conical opening 34 through the hub which is disposed at the edge of the hub shoulder 42. The disposition of the cylindrical section 44 in the conical opening 34 of the hub allows a slight swinging motion of the holding element 20 in relation to the axis of the valve disc 14 but on the other hand, radial displacement of the valve disc and holding element is prevented.

The present invention also provides for automatic centering of the valve disc 14 in relation to the valve seat 18 in closed position of the valve. To this end of the valve disc 14 is provided on the surface thereof facing the valve seat with a ring-shaped depression 46 with the inner diameter of the depression being smaller than the inside diameter of the valve seat 18 and the outside diameter of the depression being larger than the outside diameter of the valve seat. The outer circumference of the depression 46 is defined by a torus or annular ring 48 having a height axially of the valve disc that is less than the thickness of the washer 16. The inner circumference of the depression 46 is defined by another torus or annular ring 50 having an axial height that is somewhat smaller than that of the torus 48. The sealing washer 16 is substantially incompressible in the axial direction thereof in order that the separation of valve disc and valve seat in the closed position of the valve causes the same compression of the spring 24 so as not to change the force applied by the compression spring 24. The sealing washer 16 is formed of a flexible artificial material having sufficient elasticity that it can be pressed by the valve seat 18 into the depression 46 on the valve disc when the valve is closed under the pressure of the compression spring 24. Consequently the distance between the bottom of the depression 46 and the valve seat 18 is exactly determinable as being equal to the thickness of the gasket 16 despite the deformation of the gasket in closed position of the valve.

In order to assure that the gasket is pressed into the depression 46 when the valve is closed, it is preferrable that the valve seat 18 have only a small radial width. In order, however, to avoid the risk of compressing the gasket by the valve seat pressing into same and yet to achieve a good sealing effect at the valve seat it is advantageous, as illustrated, to form the valve seat 18 with the internal radial surface 54 thereof parallel to the axis of the valve aperture 12 and a radially outward portion 56 sloping toward the partition wall 10 at an angle of about 45°.

The present invention has been described above with respect to a single preferred embodiment; however, it will be appreciated by those skilled in the art that numerous modifications and variations may be made within the scope of the present invention and thus it is not intended to limit the invention to the details of illustration or precise terms of description.

What is claimed is:

1. A relief valve having a wall with a valve aperture therethrough, a valve disc disposed on one side of the wall and adapted to cover the valve aperture, a sealing washer disposed on the valve disc for cooperation with a valve seat surrounding the valve aperture, a holding element moveably connected with the valve disc on the opposite side of said wall therefrom and extending into said valve aperture, a compression spring connected between the wall and a ring about the outer end of the holding element, said holding element having a hub extending into the valve aperture with radially projecting and axially extending parallel ribs circumferentially spaced about the exterior of said hub and formed integrally with said ring, said holding element at said ribs having a smaller diameter than the inside diameter of the valve aperture, and said valve disc and holding element being connected by a head, characterized by said hub having a central axial opening therethrough of circular cross-section enlarging conically toward the valve disc, said valve disc being comprised of an inelastic material having a valve stem extending from the disc into the opening of said hub with a diameter of the stem being equal to the smallest diameter of said hub opening and having a head on the stem with a greater diameter than the smallest diameter of said head opening for extension therethrough to bear upon the outer end of the hub.

2. A valve in accordance with claim 1 further characterized by the portion of said stem disposed within the opening through said hub being cylindrical with the same diameter as the smallest diameter of the hub opening.

3. The valve of claim 1 further characterized by said valve disc being formed integrally with said valve stem and head.

4. The valve of claim 1 further defined by said holding element being comprised of a limitedly elastic artificial material.

5. The valve of claim 1 further characterized by said valve disc having an annular depression in the surface facing said valve seat comprised as an annular projection on said wall about said valve aperture, said depression encompassing said valve seat and said sealing washer being axially incompressible and elastically constructed so as to be forced into said depression in said valve disc by said valve seat by the force of said compression spring.

6. The valve of claim 5 further characterized by said valve seat having a rounded outer surface with the radially inward surface disposed parallel to the axis of said valve aperture and the radially outward circumference being slanted outwardly to said wall.

* * * * *